Aug. 8, 1939.       G. GUNN, JR       2,168,770
CLEANING MACHINE
Filed June 25, 1937       5 Sheets-Sheet 1
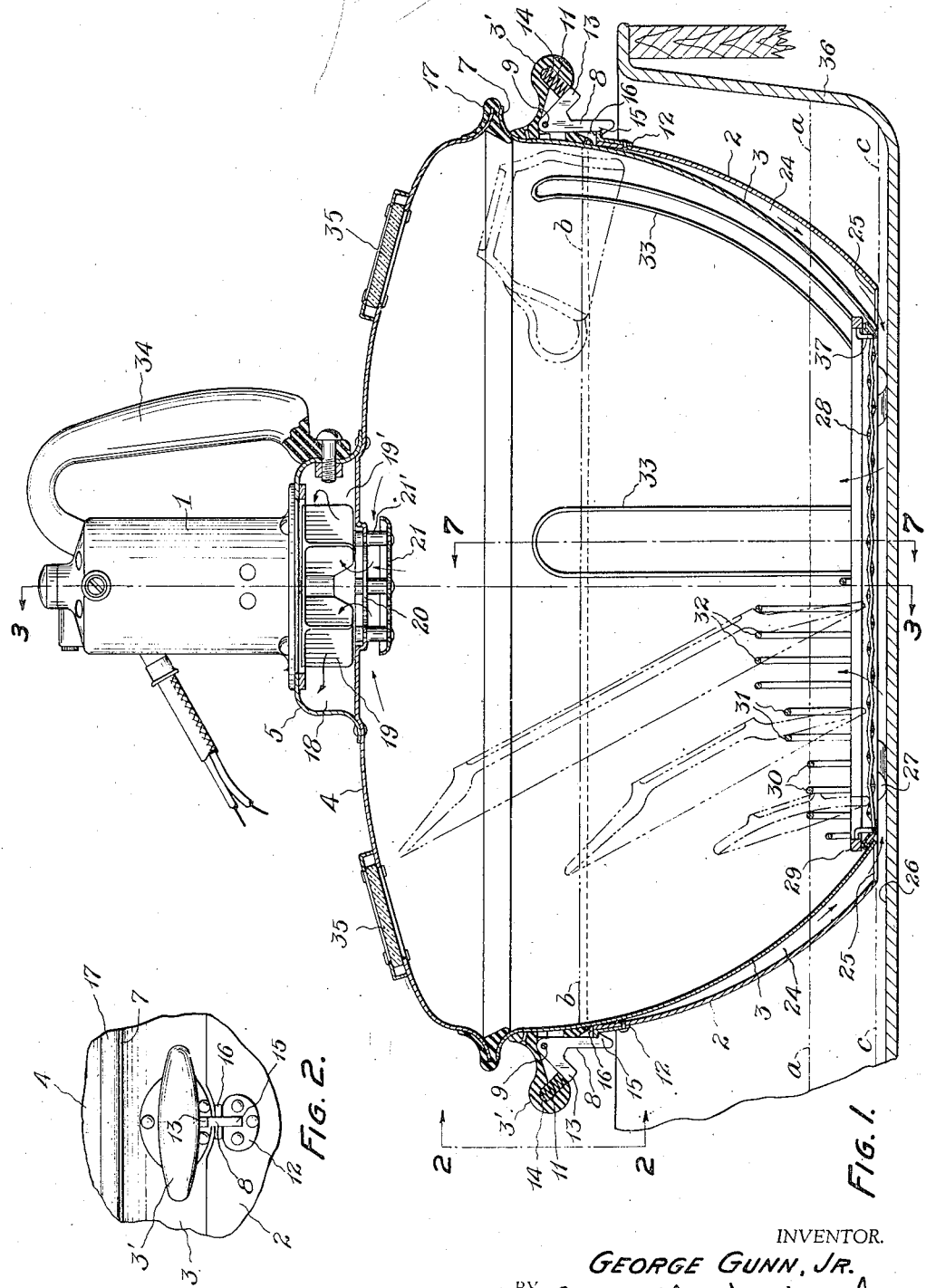
INVENTOR.
GEORGE GUNN, JR.
BY Saywell and Wesseler
ATTORNEYS Aug. 8, 1939.   G. GUNN, JR   2,168,770
CLEANING MACHINE
Filed June 25, 1937   5 Sheets-Sheet 2

INVENTOR.
GEORGE GUNN, JR.
BY Saywell and Wessler
ATTORNEYS

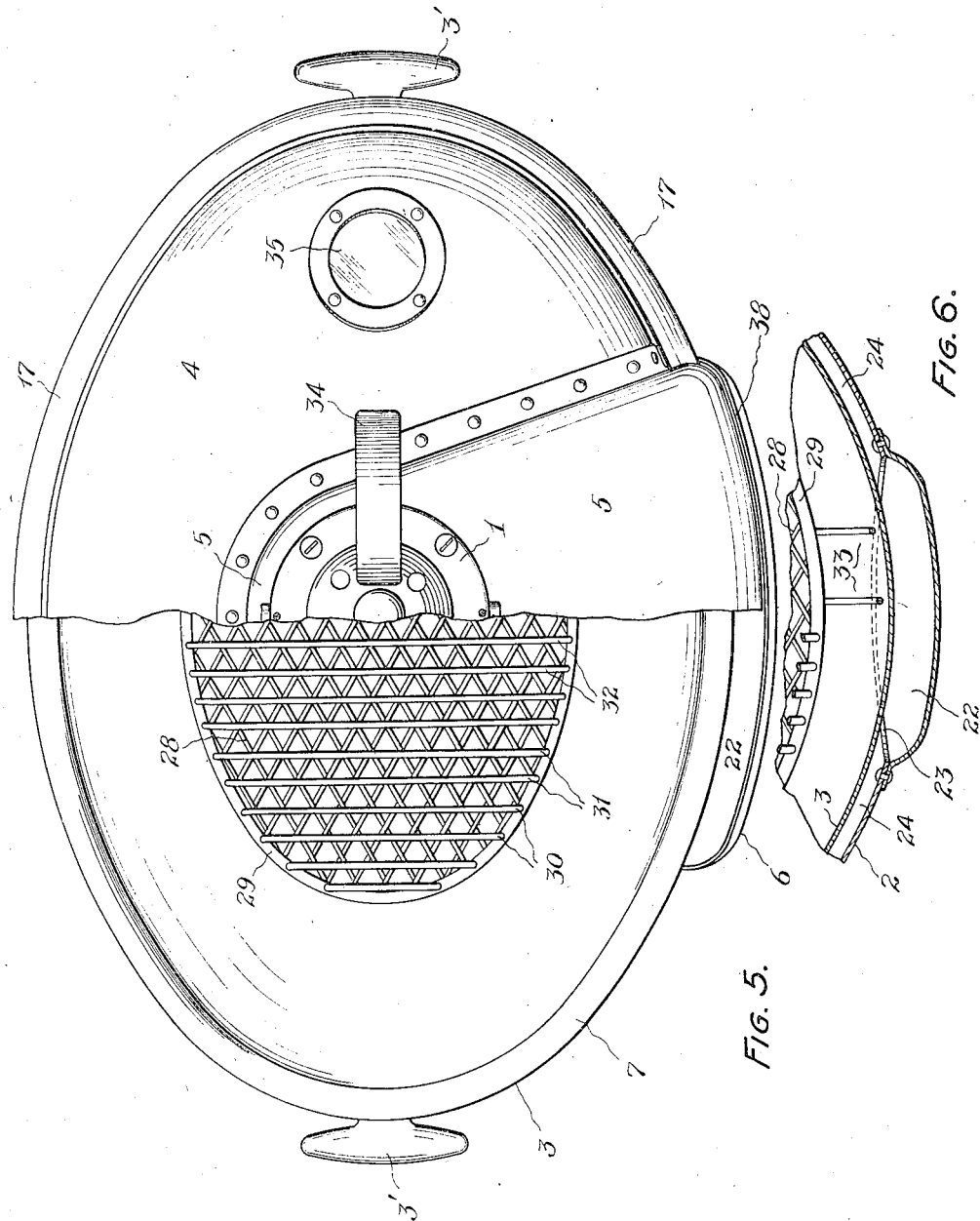

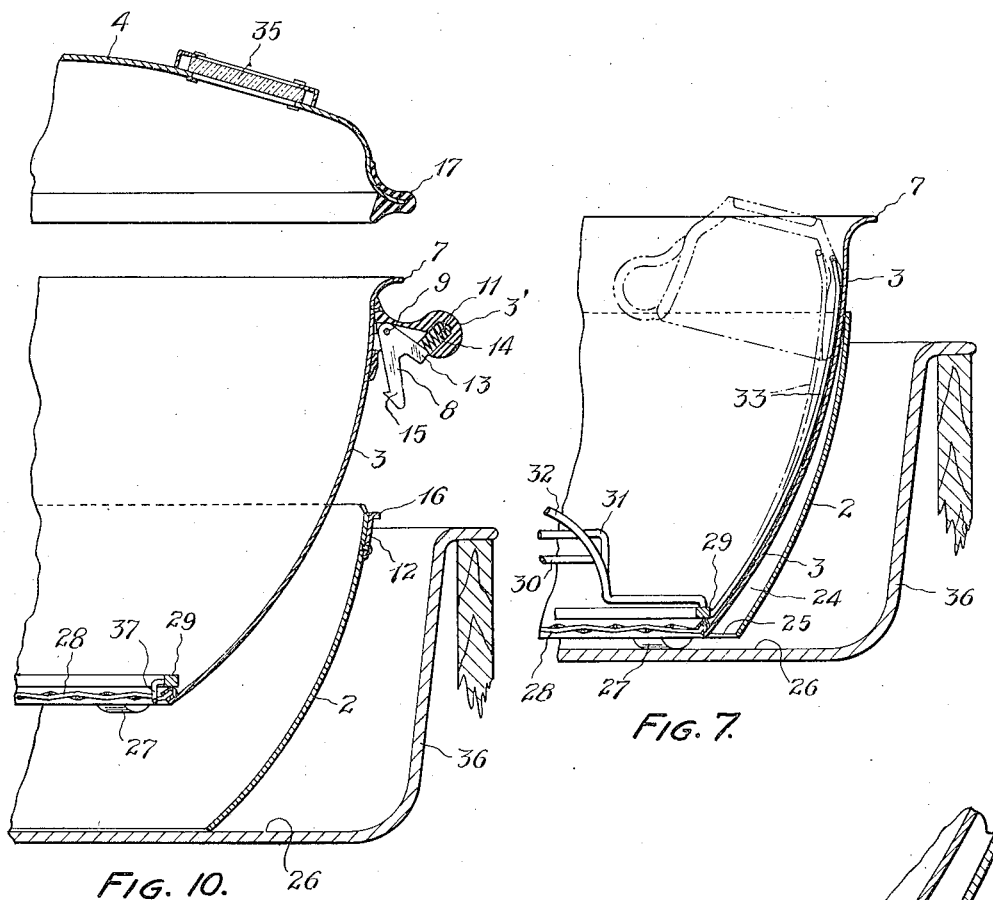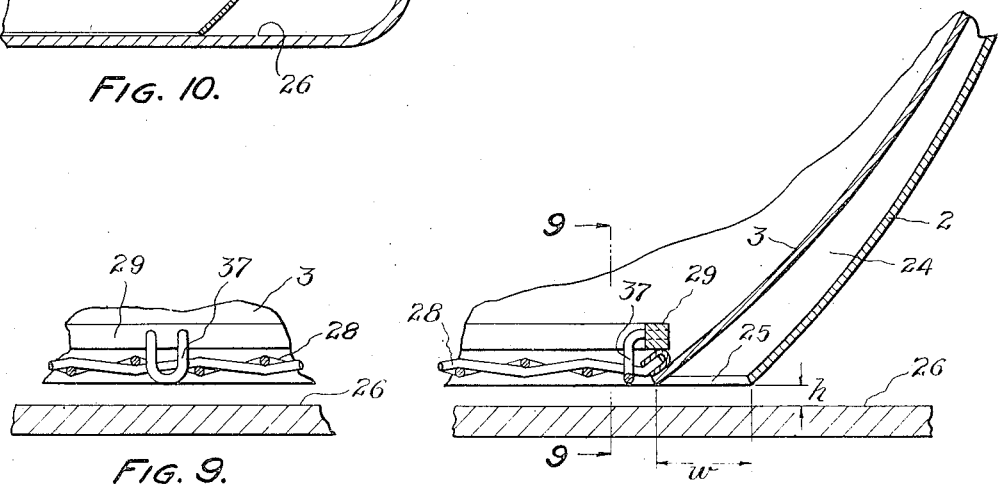

Aug. 8, 1939.　　　G. GUNN, JR　　　2,168,770
CLEANING MACHINE
Filed June 25, 1937　　　5 Sheets-Sheet 5

INVENTOR.
GEORGE GUNN, JR.
BY Saywell and Wesseler
ATTORNEYS

Patented Aug. 8, 1939

2,168,770

UNITED STATES PATENT OFFICE 2,168,770

CLEANING MACHINE

George Gunn, Jr., Seattle, Wash.

Application June 25, 1937, Serial No. 150,352

11 Claims. (Cl. 141—9)

This invention particularly relates to cleaning machines of the portable type, which function by the action of cleaning fluid agitated by moving air, and which are designed especially for the washing of such articles as dishes and clothes. The invention best lends itself to the washing of dishes and, in the following description and accompanying drawings, the invention will be illustrated by an application to a machine of such character.

The objects of the invention are to produce a cleaner, particularly adapted for use as a portable dish washer, which can be economically and conveniently made and assembled, so as to permit its sale at a price which will open up a new market for family dish washers, which will primarily serve for the washing, rinsing, and drying of the dishes ordinarily used by a small family, which can be conveniently and safely operated, and which is so small and compact as to permit its easy storage.

The annexed drawings and the following description set forth in detail certain means illustrating my improved cleaning machine, such means constituting, however, but one of the various forms in which the principle of the invention may be embodied.

In said annexed drawings:

Figure 1 is a vertical longitudinal section through a dish washing machine embodying my improvements, including a fragmentary portion of a sink in which the machine is mounted, a few dishes being shown in positions designed to be occupied thereby during the washing, rinsing, and drying thereof in my improved machine. In this figure the water levels at different times, as fully hereinafter explained, are indicated by broken lines, and the path of travel of the air, when the machine is in operation, is indicated by arrows;

Figure 2 is a fragmentary side elevation of a portion of the machine shown in Figure 1, the view being taken from the plane indicated by the line 2—2, Figure 1, this view particularly illustrating a latch provided for the purpose of releasably holding an outer casing to other parts of the machine;

Figure 5 is a plan view of the machine shown in Figures 1 and 3, in which the left hand end of the machine cover is broken away;

Figure 6 is a plan section, taken on the plane indicated by the line 6—6, Figure 3;

Figure 7 is a fragmentary transverse vertical section, taken in the plane indicated by the line 7—7, Figure 1;

Figure 8 is an enlarged sectional view of the lower right hand corner portion of the machine as shown in Figure 1, and particularly illustrates the relation between a removable rack and a screened machine bottom portion, as well as clearly showing, substantially in full size, desirable proportions, for most satisfactory operation, of the height from the sink at which the bottom of the machine is maintained, and the width of an annular discharge opening at the bottom of a casing duct from which air and steam issue preliminarily to the passage thereof through the screened bottom of the machine;

Figure 9 is a fragmentary transverse vertical section, taken in the plane indicated by the line 9—9, Figure 8;

Figure 3:
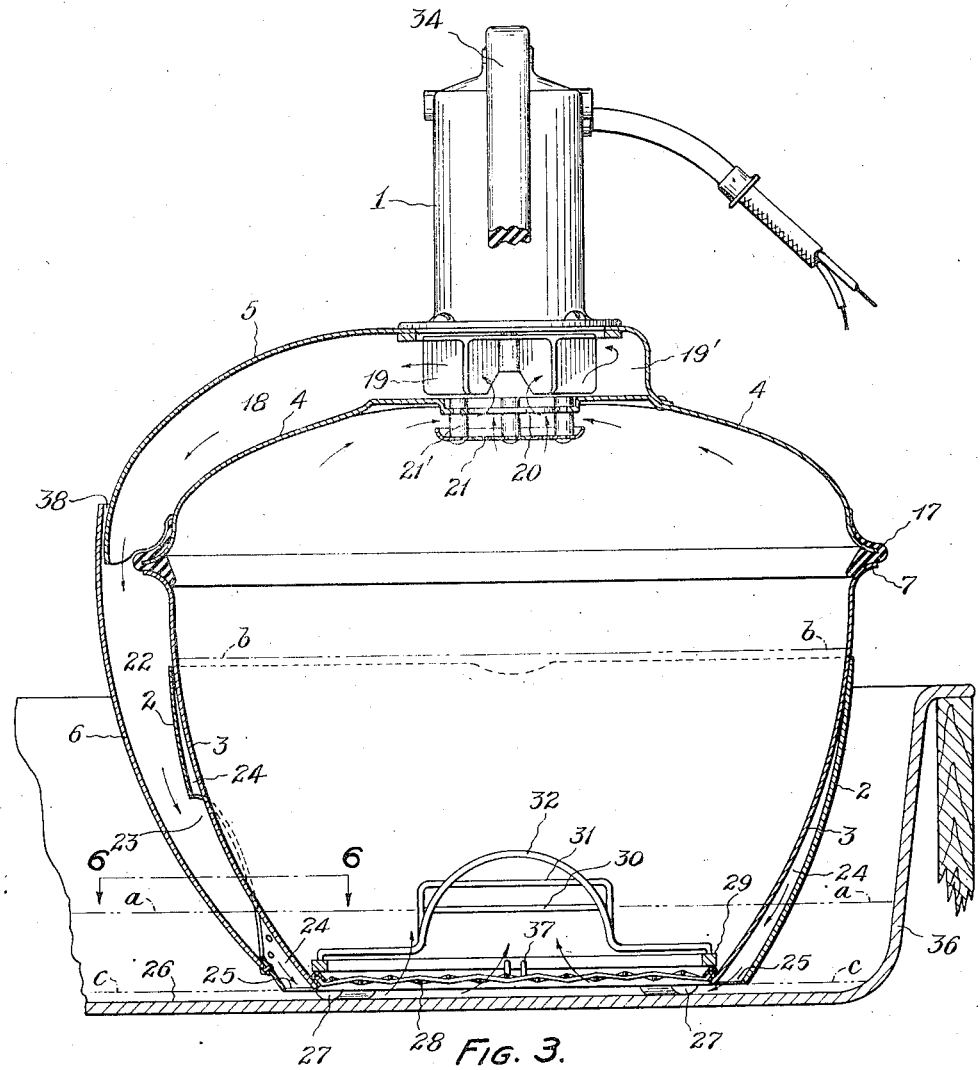
Figure 3 is a transverse vertical section through the machine, the view being taken on the plane indicated by the line 3—3, Figure 1.
Figure 11:
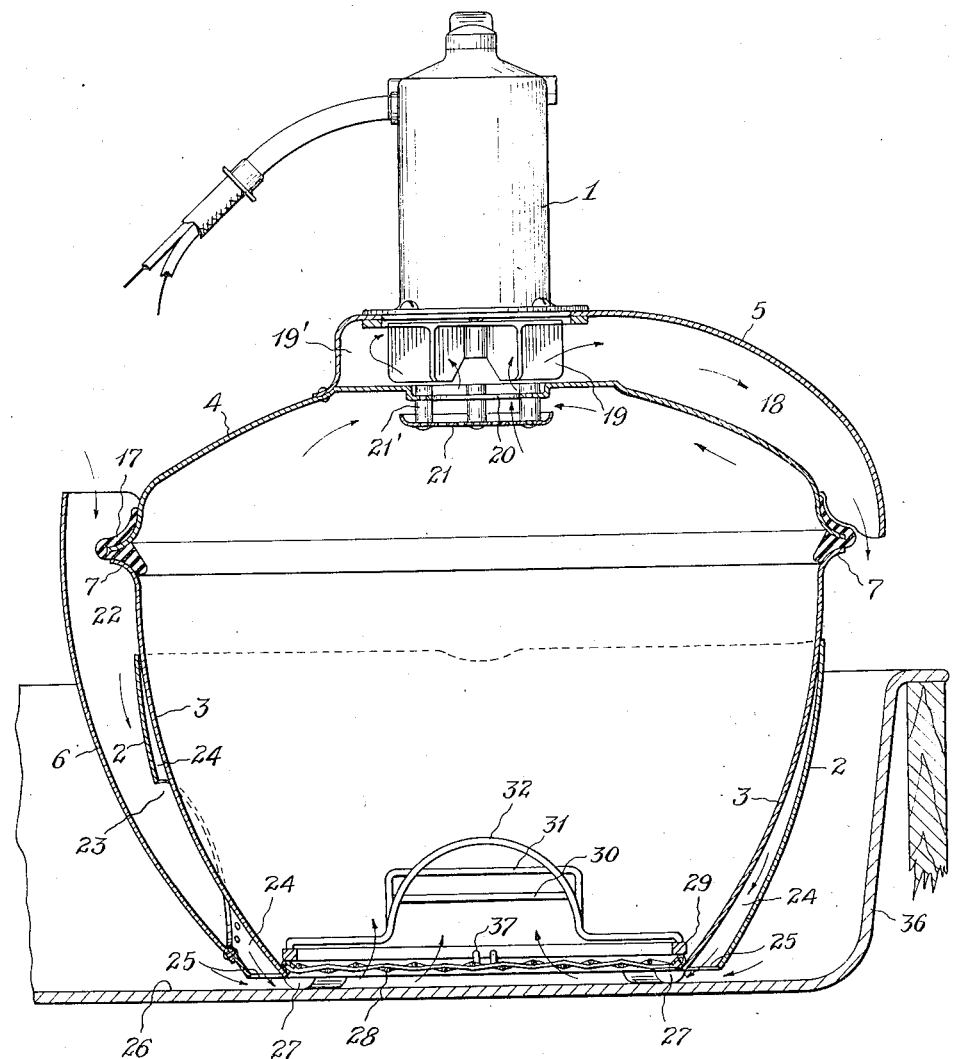

Figure 10 is a fragmentary sectional showing of the three main parts of the improved machine in disassembled relation; and Figure 11 is a view similar to Figure 3, but showing the reversed end-to-end position of a cover element, when the machine is used for drying the dishes, the path of the drying air being indicated by arrows;

Referring to the annexed drawings in which the same parts are indicated by the same respective numbers in the several views, my improved cleaning machine comprises five main elements, in addition to a power unit 1 which is, or may be, a standard vacuum cleaner motor and fan, these five main elements being preferably metal stampings and consisting of an outer casing 2, an inner casing 3 to which handles 3' are riveted, a cover 4, a cover air duct 5, and an outer casing air duct 6. An inspection of Figures 1 and 10 will show the cooperative relation of the outer and inner casings 2 and 3 and the cover 4, it being noted that the inner casing 3 is provided at the top with an outwardly flared flange 7. The casings 2 and 3 are releasably locked together by a pair of latches 8 which are fulcrumed upon the pins 9 mounted in the handles 3', the latches 8 being held in locked or unlocked position by coil springs 11 seated upon outwardly-extended fingers 13 of the latches 8 at one end and seated at the other end in recesses 14 formed in the handles 3'. The hook portions 15 of the latches 8 engage and lock beneath upper shoulder portions 16 of plates 12 riveted to the outer surface of the outer casing 2. Although the improved machine is substantially self-cleaning and therefore does not require frequent taking apart for cleaning and inspection, the manually operable latches 8 provide convenient means for holding the casing members 2 and 3 in assembled condition and yet permit the disassembling of the same when it is desired to take the machine entirely apart.

The cover member 4 is provided with a rubber gasket 17 molded to the peripheral edge thereof, which seats upon the flange 7 of the inner casing 3 and serves as a vacuum seal between the top of the inner casing 3 and the cover 4 during the operation of the machine. The cover air duct 5 is a channel-like member, of the configuration clearly shown in Figures 3 and 5, and upstands from the top of the cover 4 to which it is riveted to form an imperforate air passage 18 extending from the fan 19 of the power unit 1 to an area adjacent the top of the inner casing unit 3, as clearly shown in Figures 3 and 11. The power unit 1 is mounted upon the cover duct 5 with its driven shaft to which the fan 19 is secured extended into the passage 18, all as clearly shown in Figures 1, 3 and 11. The cover member 4 is formed with an opening 20, preferably coaxial with the fan 19, and leading into the fan chamber 19', as clearly indicated by the arrows in Figures 1, 3 and 11 showing the air being drawn into the fan chamber 19', and this opening 20 is guarded by a perforated dish-shaped baffle 21 supported by pins 21' inwardly of the cover member 4 a spaced distance from the inner surface of the cover member 4, as clearly shown in Figures 1, 3 and 11, this baffle member 21 serving to prevent the fingers of the operator inadvertently entering the fan chamber 19', if perchance the motor is allowed to run when the cover unit 4 is removed from the inner casing unit 3.

When the machine is being operated for washing and rinsing dishes, the cover unit 4 is mounted upon the inner casing unit 3, in the manner indicated in Figure 3, and, upon the motor unit 1 being turned on, the air discharged from the fan 19 passes outwardly and downwardly through the passage 18 whence it is discharged into the outer casing air duct 6 which is riveted adjacent its bottom end, as clearly appears in Figure 6, to the lower end portion of the outer casing member 2, so as to provide a passage 22 between the casing air duct 6 and the outer casing member 2. The air passes downwardly in the passage 22 and, from the lower part of the latter, passes into the space 24 between the outer casing 2 and the inner casing 3, through an opening 23 in the outer casing member 2, which opening is clearly shown in Figures 3, 6 and 11. In the space 24 the air spreads out around the entire circumference of the inner casing 3 and passes downwardly and inwardly of the lower part of the inner casing 3 and beneath the same, through an annular opening 25 at the bottom of the space 24.

Figure 4:
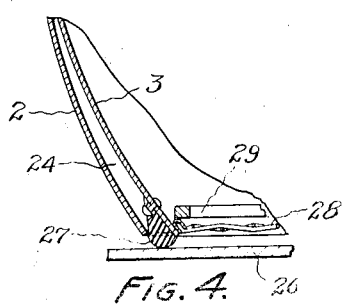
Figure 4 is a transverse vertical fragmentary section, showing one of a plurality of feet which are provided for the purpose of supporting the bottom of the washing machine some distance above the floor of the sink.

It will be noted in Figures 3 and 4 that the bottoms of the casings 2 and 3 are held a spaced distance above the support 26, which is preferably the bottom of a sink 36, by four hard rubber feet 27 secured to the outer surface of the inner casing member 3. The support 26 may be, of course, any suitable receptacle such as a dishpin. The bottom of the machine is open except for a screen 28 which is supported upon the inner face of the inner casing member 3 adjacent the bottom opening of the machine. Therefore, the air issuing from the annular opening 25 spreads under the machine in the space between the support 26 and the screen 28 and passes upwardly through the mesh of the screen 28 into the cleaning chamber.

Mounted upon the periphery of the screen 28 is a removable annular rack 29, Figure 5, adapted to receive the ends of dish supporting members of varied heights, such as illustrated by the wire holder consisting of the wire clips 30, 31, and 32, Figures 1 and 5. Also secured to the annular rack 29 are removable curved elongated U-shaped upstanding spring fingers 33, Figure 1, which press at their upper ends against the inner wall of the inner casing 3 and are adapted resiliently to support cups against the casing 3, as clearly shown in Figures 1 and 7. The rack 29 is located in proper relative position by a U-shaped tongue 37 secured thereto at its ends and projecting downwardly so that its body can be passed through an opening of the screen 28.

A handle 34 secured to the power unit 1 and the cover air duct 5 serves for the manipulation of the cover member 4, and the latter is provided with observation windows 35 of Pyrex glass, all as clearly appears in Figure 1.

The machine is preferably used in an ordinary sink 36 and is shaped for convenient adaptation to such a support, being of general elliptical formation in plan section, and tapering in width from top to bottom of the main container 2—3. The support for the machine proper must necessarily be a receptacle or a dished member which will hold sufficient water to form a water seal around the container when the machine is operating and part of the water has been drawn up into the container to raise the water therein to its operating level. An ordinary kitchen sink with the machine proper resting by its feet 27 upon the floor of the sink is the most convenient receptacle for the purpose.

The machine is operated as follows: After the dishes have been properly and carefully packed in the assembled outer and inner casing members 2 and 3 as closely as possible, or as is necessary to accommodate the pack being washed, care being taken that no considerable area of the surfaces of adjacent dishes are in close contact, and the arrangement of plates, saucers, and cups being preferably such as is suggested by a view thereof in Figure 1, with larger pieces disposed adjacent the long sides of the machine, and the silverware scattered in positions found available therefor, the cover member 4 is put into position and thus the upper portion of the interior of the packed machine is substantially hermetically sealed. Then hot water is introduced into the sink 36, the drain thereof having been plugged, until the water stands at a level indicated for purposes of illustration by the broken line a—a, Figures 1 and 3. After adding a suitable non-sudsing soap, the motor unit 1 is started which effects a sucking of air out of the top of the interior of the machine and eventually causes the water level to rise in the machine substantially to the level indicated by the broken line b—b, Figures 1 and 3. This causes the water level in the sink to fall substantially to the level indicated by the broken line c—c, Figures 1 and 3. Actually, the water is forced upwardly through the screen 28 upon the bottom of the machine by the atmospheric pressure on the outside of the casing member 3 supplemented by the air under slight pressure being discharged from the fan 19. The air discharged from the fan 19 passes outwardly through the passage 18, as clearly shown in Figures 3 and 5, and thence downwardly through the passage 22, whence it passes through the opening 23 into the space 24 between the outer and inner casing members 2 and 3, respectively, and thence through the annular opening 25 surrounding the bottom opening of the machine and thence into the interior of the machine bubbling up through the water around the dishes and agitating the water.

The upper end of the outer casing air duct 6 exteriorly laps the lower end of the cover air duct 5, as clearly appears in Figure 3, and there is a slight space 38 provided between these overlapping portions of the air ducts 5 and 6. This slight space 38 serves as a breather opening to the atmosphere for the air circuit. This breather opening prevents the building up of pressure beyond atmospheric pressure within the fan chamber, and serves an important part in maintaining the proper balance of pressures necessary to effect an efficient agitation of the cleaning fluid.

The air which is discharged through the annular opening 25 is deflected inwardly toward the screened bottom and thus effectively aids in restraining the water from flowing outwardly into the sink portion exteriorly of the washing machine.

The restraining of the water from flowing outwardly is effected by the relation between the distance between the bottom of the machine and the sink support, and the width of the annular opening 25, which is substantially such as is shown in Figure 8, wherein these dimensions are shown substantially in full size, and in which the dimension "$h$" indicates the proper height of the machine above the sink 36, and the width of the annular opening 25 is indicated by the dimension "$w$". If the dimension "$h$" is substantially greater than that shown in Figure 8, with reference to the dimension "$w$" shown therein, the intensity of the vacuum on the vertical opening between the floor of the sink 36 and the bottom of the casing 3 will be reduced and the flow of air through the annular opening 25 from the space 24 between the outer casing member 2 and the inner casing member 3 will not be effectively directed inwardly and thus there will not be the proper restraint on the tendency of the liquid to flow outwardly.

The same air is recirculated, with a very slight influx of additional air through the breather space 38, Figure 3, thus minimizing loss of heat and keeping the wash water hot for a substantial length of time. The air being recirculated contains considerable steam and this steam is constantly returned back into the machine, and is condensed in and substantially heats any water from the sink 36 which may be swept into the machine by the inwardly directed discharge of air from the annular opening 25.

Inasmuch as the main container 2—3 of the machine tapers downwardly in vertical cross-section, the screened bottom of the machine is substantially smaller in area than the main body of the washing chamber, and this construction is of essential importance in insuring an effective agitation of the water by the air, since the construction insures the entrance of the air into the machine from beneath near the center of the machine. As before stated, the breather space 38 is an important factor in insuring the effective agitation of the water by the air.

After the machine has been operated for washing the dishes, for a suitable period, depending upon the condition of the dishes and other effective factors, a period averaging about five minutes, the motor unit 1 is shut off, the dirty water removed by opening the sink drain, or by lifting the entire machine and permitting the water to run off from the bottom thereof. Air will enter the machine through the breather opening 38 permitting the water in the machine to run out through the screened bottom. Then the sink drain is again plugged and rinse water introduced into the sink 36 to the level of the line $a$—$a$, and the motor unit again started. A rinsing operation results, similar to the washing operation heretofore described, and then again the motor is turned off and the sink drain opened. If desired, the rinsing can be effected by removing the cover unit 4 and pouring the rinse water over the washed dishes.

After the rinse water has drained out of the machine and out of the sink, the cover member 4 is lifted and turned end-to-end into the position clearly shown in Figure 11, so that the cover air duct 5 is upon the side of the machine opposite to the outer casing air duct 6. The motor is then started and air is drawn through the machine and over the dishes and into the fan chamber 19' and discharged through the fan 19 into and through the passage 18 and thence to the atmosphere over the edge of the cover 4. Inasmuch as the machine is hot as a result of the washing and rinsing operations, and the dishes and sink also being hot, the air being circulated for drying purposes becomes warm and effectively and quickly dries the dishes.

What I claim is:

1. A cleaning machine comprising spaced inner and outer casings having bottom openings and open tops, means forming an air duct exteriorly of the casings, said air duct having an opening communicating with the space between the casings, said space being arranged to direct fluids, passing outwardly therefrom, toward the bottom opening of the inner casing, means for sealing the space between said casings above said duct opening, a cover unit for the inner casing and forming therewith a cleaning chamber, and means for drawing air from the cleaning chamber and discharging it into said air duct.

2. A cleaning machine comprising spaced inner and outer casings having bottom openings and open tops, means forming an air duct exteriorly of the casings, said air duct having an opening communicating with the space between the casings, said space being arranged to direct fluids, passing outwardly therefrom, toward the bottom opening of the inner casing, means for sealing the space between said casings above said duct opening, a cover unit for the inner casing and forming therewith a cleaning chamber, a suction fan supported by said cover unit and arranged to draw air from the cleaning chamber, means for operating the fan, and means forming an air duct leading from the discharge side of the fan to the aforementioned air duct.

3. A cleaning machine comprising spaced inner and outer casings having bottom openings and open tops, means forming an air duct exteriorly of the casings, said air duct having a breather opening to atmosphere and communicating adjacent one end with the space between the casings, said space being open at the bottom and arranged to direct fluids, passing outwardly therefrom, toward the bottom opening of the inner casing, means for sealing the space between said casings above said duct opening, a cover unit for the inner casing and forming therewith a cleaning chamber, and means for drawing air from the cleaning chamber and discharging it into said air duct.

4. A cleaning machine comprising spaced inner and outer casings having bottom openings and open tops, means forming with the inner and outer casings an air duct exteriorly of the casings, said air duct having a breather opening to atmosphere and communicating adjacent one end with the space between the casings, said space being open at the bottom and arranged to direct fluids, passing outwardly therefrom, toward the bottom opening of the inner casing, means for sealing the space between said casings above said duct opening, a cover unit for the inner casing and forming therewith a cleaning chamber, a suction fan supported by said cover unit and arranged to draw air from the cleaning chamber, means for operating the fan, and means forming an air duct leading from the discharge side of the fan to the other end of said aforementioned air duct.

5. A cleaning machine comprising inner and outer casings having bottom openings, the outer casing top portion closely engaging the outer surface of the inner casing, the outer casing below said top portion diverging from the inner casing so as to form a gradually widening annular space therebetween, said space having an annular discharge opening directed toward the bottom opening of the inner casing and surrounding said opening, a cover unit for the inner casing and forming therewith a cleaning chamber, a power unit mounted upon said cover unit and having a driven suction fan extended into said cleaning chamber, and means forming an air conduit leading from the discharge side of said fan to said space between the inner and outer casings.

6. A cleaning machine comprising inner and outer casings having bottom openings, the outer casing top portion closely engaging the outer surface of the inner casing, the outer casing below said top portion diverging from the inner casing so as to form a gradually widening annular space therebetween, said space having an annular discharge opening directed toward the bottom opening of the inner casing and surrounding said opening, a cover unit for the inner casing and forming therewith a cleaning chamber, a power unit mounted upon said cover unit and having a driven suction fan extended into said cleaning chamber, means forming an air conduit leading from the discharge side of said fan to said space between the inner and outer casings, and means for maintaining atmospheric pressure in the air conduit.

7. A dish washing machine comprising spaced inner and outer casing members having bottom openings, means closing the top of the space between said casings, said space having a bottom discharge opening adjacent the space below the bottom openings of the casings, a screen supported by said inner casing and covering the bottom opening thereof, a support for dish holders mounted in the inner casing above the screen, a plurality of dish-supporting elements mounted on said support, a cover unit for said inner casing, means for drawing air through said bottom openings and screen and through the inner casing and discharging it from the latter, and means forming an air duct leading from the discharge side of said air-drawing means to the space between said casings.

8. A dish washing machine comprising spaced inner and outer casing members generally elliptical in plan section and tapered downwardly in vertical longitudinal and vertical transverse sections, said casings having bottom openings, means closing the top of the space between said casings, said space having a bottom discharge opening surrounding the space adjacently below the bottom openings of said casings, a screen supported by said inner casing and covering the bottom opening thereof, a support for dish holders mounted in the inner casing above the screen, a plurality of dish-supporting elements mounted on said support, a cover unit for said inner casing and forming therewith a cleaning chamber, means for drawing air through said bottom openings and screen and through the cleaning chamber and discharging it from the latter, and means forming an air duct leading from the discharge side of said air-drawing means to the space between said casings.

9. An angularly adjustable closure and power unit for a cleaning machine comprising a cover member having an opening therethrough, a channel-like member eccentrically mounted upon and exteriorly of the cover member and extended at one end to the edge of the latter, said channel-like member forming with the cover member an exterior imperforate elongated air duct leading from the cover opening to atmosphere, whereby, when the unit covers a cleaning machine having a top rim irregular in outline, the air duct, in a certain angular position of the unit, discharges exteriorly of the cleaning machine, and, in another angular position of the unit, discharges into the interior of the cleaning machine, and a motor secured to the air duct body and having a driven fan disposed in the air duct opposite said cover opening.

10. An angularly adjustable sealing closure and power unit for a cleaning machine comprising a cover member formed with an endless peripheral gasket and having a substantially central opening, a channel-like member mounted upon and exteriorly of one side of the cover member and forming with the latter an exterior imperforate elongated air duct leading from the cover opening to atmosphere adjacent the edge of the cover member, whereby, when the unit covers a cleaning machine having a top rim irregular in outline, the air duct, in a certain angular position of the unit, discharges exteriorly of the cleaning machine, and, in another angular position of the unit, discharges into the interior of the cleaning machine, and a motor mounted on the channel member and having a driven fan disposed in the air duct coaxially with said cover opening.

11. A cleaning machine comprising an inner open-bottom casing and an outer casing, the outer casing adjacent its top closely engaging the outer surface of the inner casing, the outer casing below its said engaging portion diverging from the inner casing so as to form a space between said casings, said space having a discharge opening directed toward the bottom opening of the inner casing, a cover unit for the inner casing and forming therewith a cleaning chamber, means for withdrawing air from the cleaning chamber and discharging the air so withdrawn, and means forming an air duct leading from the discharge side of said air-withdrawing means to the space between the inner and outer casings.

GEORGE GUNN, Jr.